(12) United States Patent
Gwidt et al.

(10) Patent No.: US 7,599,785 B2
(45) Date of Patent: *Oct. 6, 2009

(54) MULTIPLE INJECTION BLEND FOR DIRECT INJECTED ENGINES

(75) Inventors: Jesse M. Gwidt, Brighton, MI (US);
Jonathan T. Shibata, Milan, MI (US);
Vijay Ramappan, Novi, MI (US);
Stuart R. Smith, Howell, MI (US);
Michael J. Lucido, Northville, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 281 days.

This patent is subject to a terminal disclaimer.

(21) Appl. No.: 11/676,550

(22) Filed: Feb. 20, 2007

(65) Prior Publication Data

US 2008/0196693 A1    Aug. 21, 2008

(51) Int. Cl.
*F02M 61/16* (2006.01)

(52) U.S. Cl. ................................ 701/105; 123/300
(58) Field of Classification Search ......... 701/103–105, 701/110, 111; 123/299, 300, 305, 478, 480
See application file for complete search history.

(56) References Cited

U.S. PATENT DOCUMENTS

| 4,532,907 | A | * | 8/1985 | Buglione et al. | ............ | 123/478 |
| 7,322,339 | B1 | * | 1/2008 | Gwidt et al. | ................ | 123/299 |
| 7,415,348 | B1 | * | 8/2008 | Ramappan et al. | .......... | 701/105 |

* cited by examiner

*Primary Examiner*—Hieu T Vo

(57) ABSTRACT

A fuel injection system for a direct fuel injection engine is provided. The system includes an injection mode module that selects a fuel injection mode to be one of a single injection mode and a dual injection mode during engine operation and a fuel injection command module that commands fuel injection events based on a crankshaft position, the fuel injection mode and a fuel percentage blending schedule.

21 Claims, 5 Drawing Sheets

MULTIPLE INJECTION BLEND FOR DIRECT INJECTED ENGINES

FIELD

The present disclosure relates to methods and systems for direct fuel injection engines.

BACKGROUND

The statements in this section merely provide background information related to the present disclosure and may not constitute prior art.

Controlling the amount of fuel and air to be delivered per cylinder for a four stroke internal combustion engine is important to achieve optimum performance. Proper timing of intake and exhaust valves also provide for better performance. Conventional engines include camshafts that regulate the timing of the valves. The rotation of the camshaft can be controlled to ensure proper timing of each valve. In addition cam phasers may be included to alter the position of the camshafts relative to the crankshaft, which provides for further opportunities to properly adjust the timing of each valve.

The placement of fuel injectors within the engine and the control of fuel injection timing also impacts engine performance. Spark-ignited direct injected (SIDI) engines locate one fuel injector per cylinder, mounted directly over the cylinder head. Each injector is controlled individually to inject fuel directly into the cylinder.

Conventional methods of controlling fuel during idle conditions in a SIDI engine include intentionally retarding the spark timing in order to provide a reserve torque. Spark timing is then advanced when a request for torque is initiated. This allows the engine to respond to load demands during idle operation. Retarding spark at idle provides for sub-optimal efficiency.

Other methods of fuel injection control include delivering multiple fuel injection events per cylinder per combustion cycle. A direct injection engine may use two injection events per cylinder per combustion cycle in special operation regimes to provide additional energy for converter lightoff, smooth idle and reduce engine knock. Unfortunately, the dual injection mode of operation produces higher hydrocarbon emissions and particulates. Accordingly, engine control may primarily include providing one injection event per cylinder per combustion cycle for emissions reasons. The dual injection method may be sparingly used for special operation regimes.

Dual injection per cylinder per combustion cycle generates more or less engine torque than a single injection mode within the same engine at similar operating conditions. Accordingly, drivability may be affected by sudden engine output torque changes during periods when the fuel delivery mode changes from a single to a multiple injection mode and vice versa.

SUMMARY

Accordingly, a fuel injection system for a direct fuel injection engine is provided. The system includes an injection mode module to select a fuel injection mode to be one of a single injection mode and a dual injection mode and a fuel injection command module that commands fuel injection events based on a crankshaft position, the fuel injection mode and a fuel percentage blending schedule.

In addition, a fuel injection method for a direct fuel injection engine is provided. The method includes operating the engine in a single injection mode to inject fuel once per cylinder per combustion cycle; commanding fuel at a first rate during an intake cycle; receiving a request to change the fuel delivery mode; transitioning to a dual injection mode by commanding fuel at a second rate and at a third rate during the intake and compression cycles, wherein the second rate is decreased and the third rate is increased during subsequent cycles until target second and third rates are reached.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
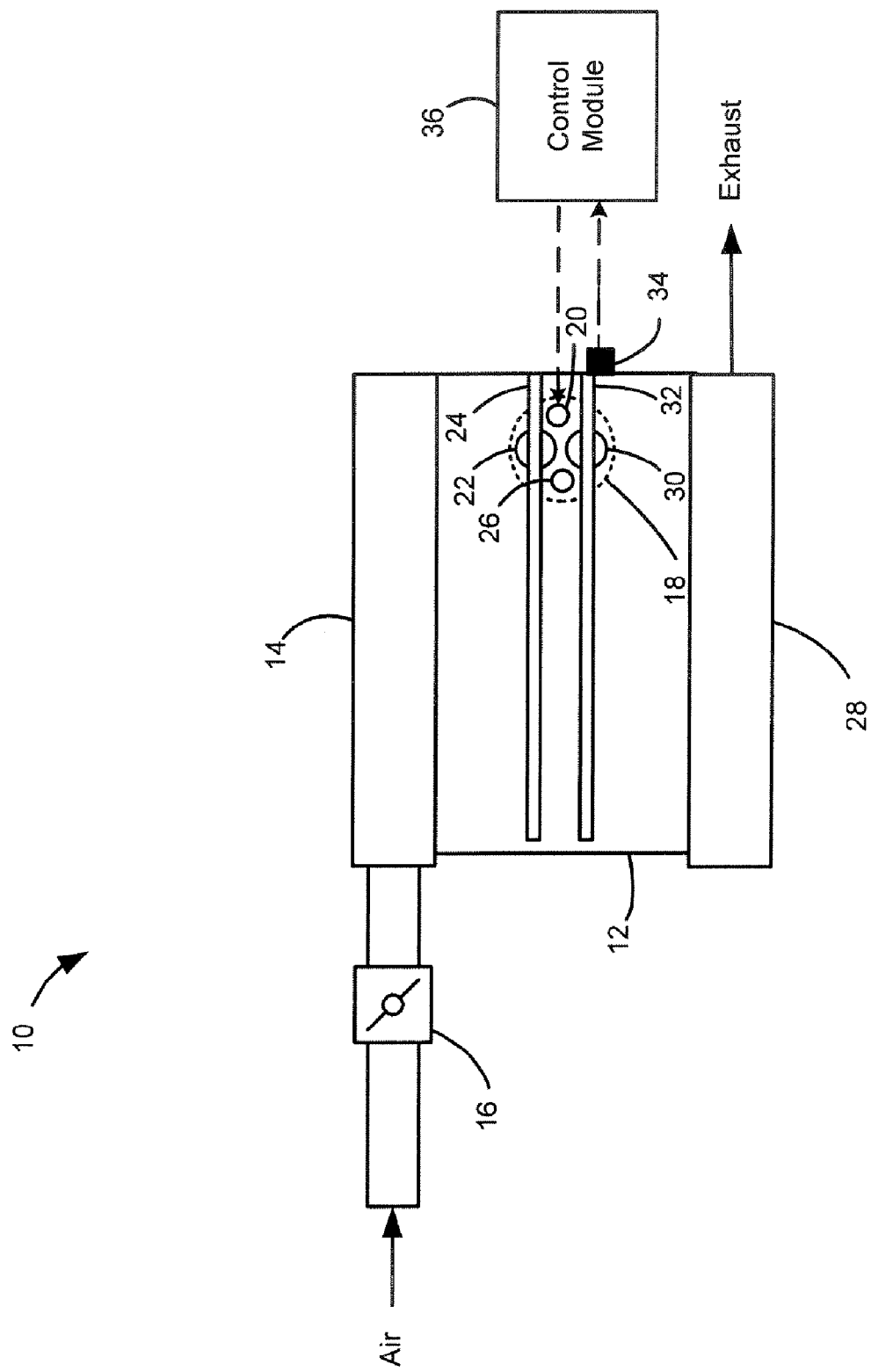
FIG. 1 is a functional block diagram illustrating an internal combustion engine system including direct fuel injection hardware.

The following description is merely exemplary in nature and is in no way intended to limit the disclosure, its application, or uses. For purposes of clarity, the same reference numbers will be used in the drawings to identify the same elements. As used herein, the term module and/or device refers to an application specific integrated circuit (ASIC), an electronic circuit, a processor (shared, dedicated, or group) and memory that execute one or more software or firmware programs, a combinational logic circuit and/or other suitable components that provide the described functionality.

Referring now to FIG. 1, an engine system 10 includes an engine 12 that combusts an air and fuel mixture to produce drive torque. Air is drawn into an intake manifold 14 through a throttle 16. The throttle 16 regulates mass air flow into the intake manifold 14. Air within the intake manifold 14 is distributed into cylinders 18. Although a single cylinder 18 is illustrated, it can be appreciated that the engine can have a plurality of cylinders including, but not limited to, 2, 3, 4, 5, 6, 8, 10, 12 and 16 cylinders.

A fuel injector 20 is electronically controlled to inject fuel into the cylinder 18. Fuel is combined with air as it is drawn into the cylinder 18 through the intake port. An intake valve 22 selectively opens and closes to enable the air to enter the cylinder 18. The intake valve position is regulated by an intake camshaft 24. A piston (not shown) compresses the air/fuel mixture within the cylinder 18. A spark plug 26 initiates combustion of the air/fuel mixture, driving the piston in the cylinder 18. The piston drives a crankshaft (not shown) to produce drive torque. Combustion exhaust within the cylinder 18 is forced out through an exhaust manifold 28 when an exhaust valve 30 is in an open position. The exhaust valve position is regulated by an exhaust camshaft 32. The exhaust can then be treated in an exhaust system (not shown). Although single intake and exhaust valves 22,30 are illustrated, it can be appreciated that the engine 12 can include multiple intake and exhaust valves 22,30 per cylinder 18.

A crankshaft sensor 34 senses a position of the crankshaft and generates a crankshaft signal. A control module 36 receives the crankshaft signal, interprets the signal as degrees of rotation and schedules fuel injection events based on the interpretation of the signal. The control module 36 sends a fuel injection signal to the fuel injector to control the amount and the timing of the fuel delivery. The fuel injection signal can be a pulse width modulated signal where the pulse width regulates the amount of fuel delivered to the cylinder.

Figure 2:
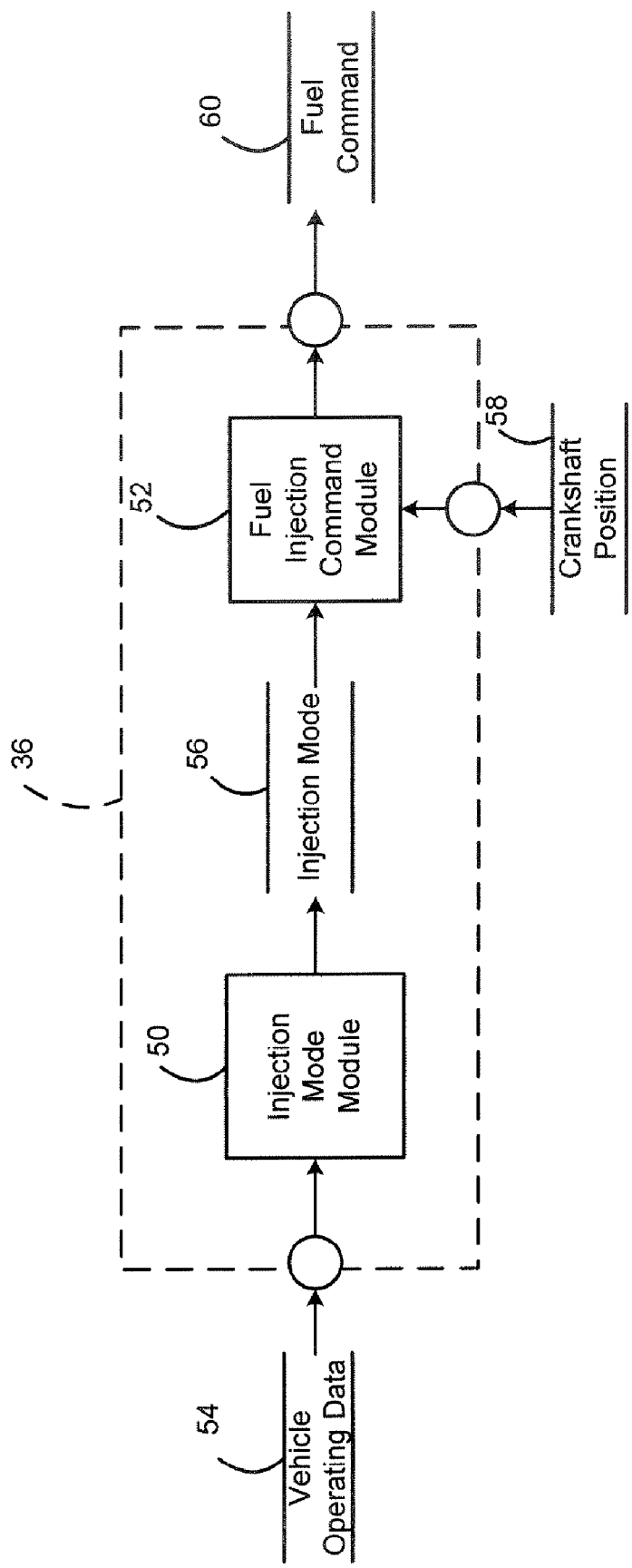
FIG. 2 is a dataflow diagram illustrating a fuel injection system.

Referring now to FIG. 2, the present disclosure provides a control method and system that governs the transitions between single and dual fuel injection modes. A dataflow diagram illustrates a fuel injection system that may be embedded within the control module 36. Various embodiments of fuel injection systems according to the present disclosure may include any number of sub-modules embedded within the control module 36. The sub-modules shown may be combined and/or further partitioned to similarly govern the transitions between the single injection mode and the dual injection mode during engine operation.

Figure 3:
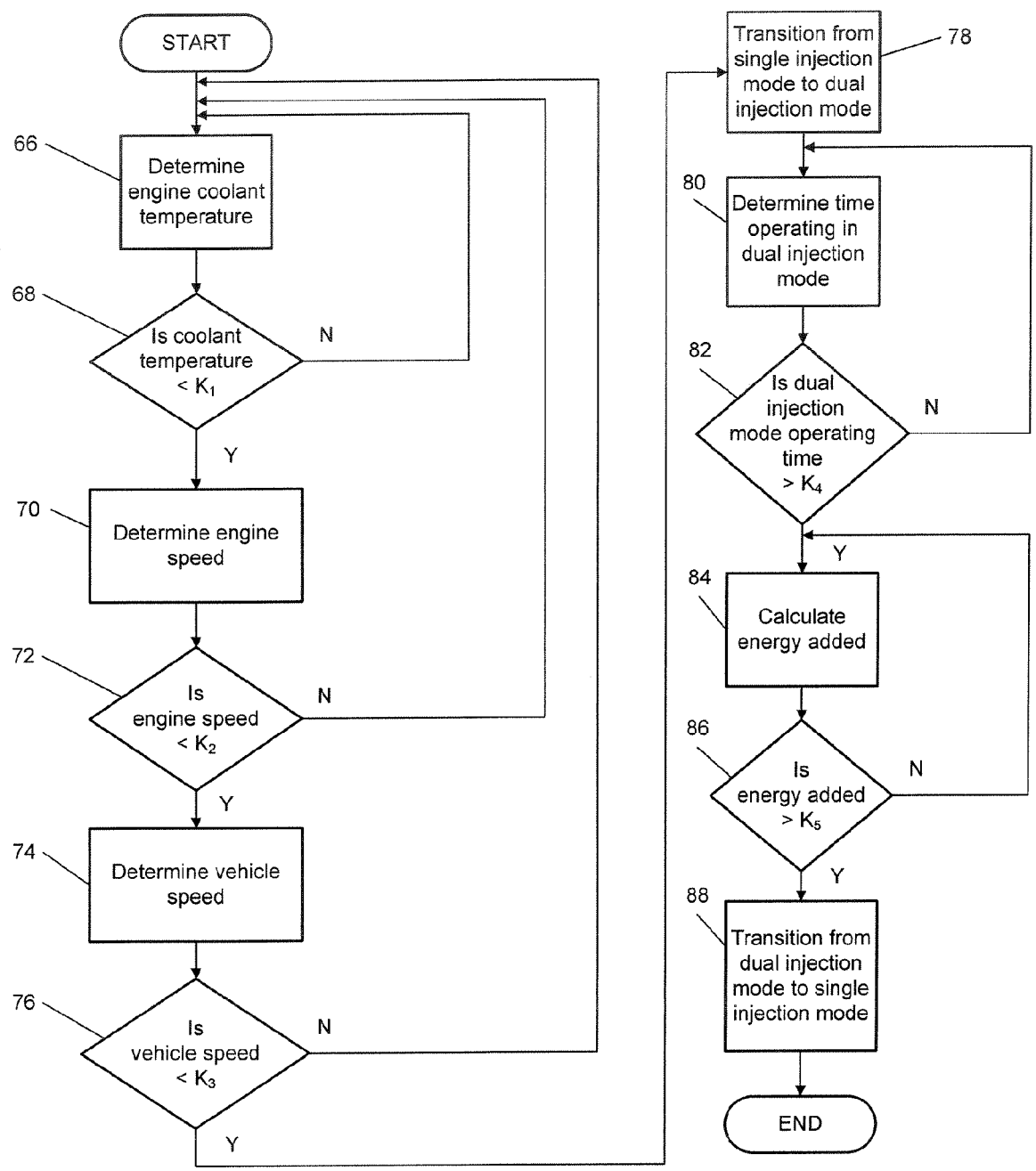
FIG. 3 is a flow chart illustrating a method of transitioning between single injection and dual injection modes.

In various embodiments, the control module 36 of FIG. 2 includes an injection mode module 50 and a fuel injection command module 52. The injection mode module 50 receives engine and vehicle operating data 54 as an input. As can be appreciated, the inputs to the injection mode module 50 may be sensed from the system 10, received from other control modules (not shown) in the system, or determined from other sub-modules within the control module 36. FIG. 3 provides a flow chart with an exemplary method of transitioning between single injection and dual injection modes where vehicle operating data 54 includes coolant temperature, engine speed and vehicle speed. This exemplary method will be described in greater detail hereinafter.

Based on the operating data 54, the injection mode module 50 selects an injection mode 56 to be one of a single injection mode and a dual injection mode. The fuel injection command module 52 receives the injection mode 56 and a crankshaft position 58 as inputs. The fuel injection command module 52 schedules fuel injection events and provides a fuel command 60 based on the injection mode 56, the crankshaft position 58 and a blending schedule 62.

Figure 4:
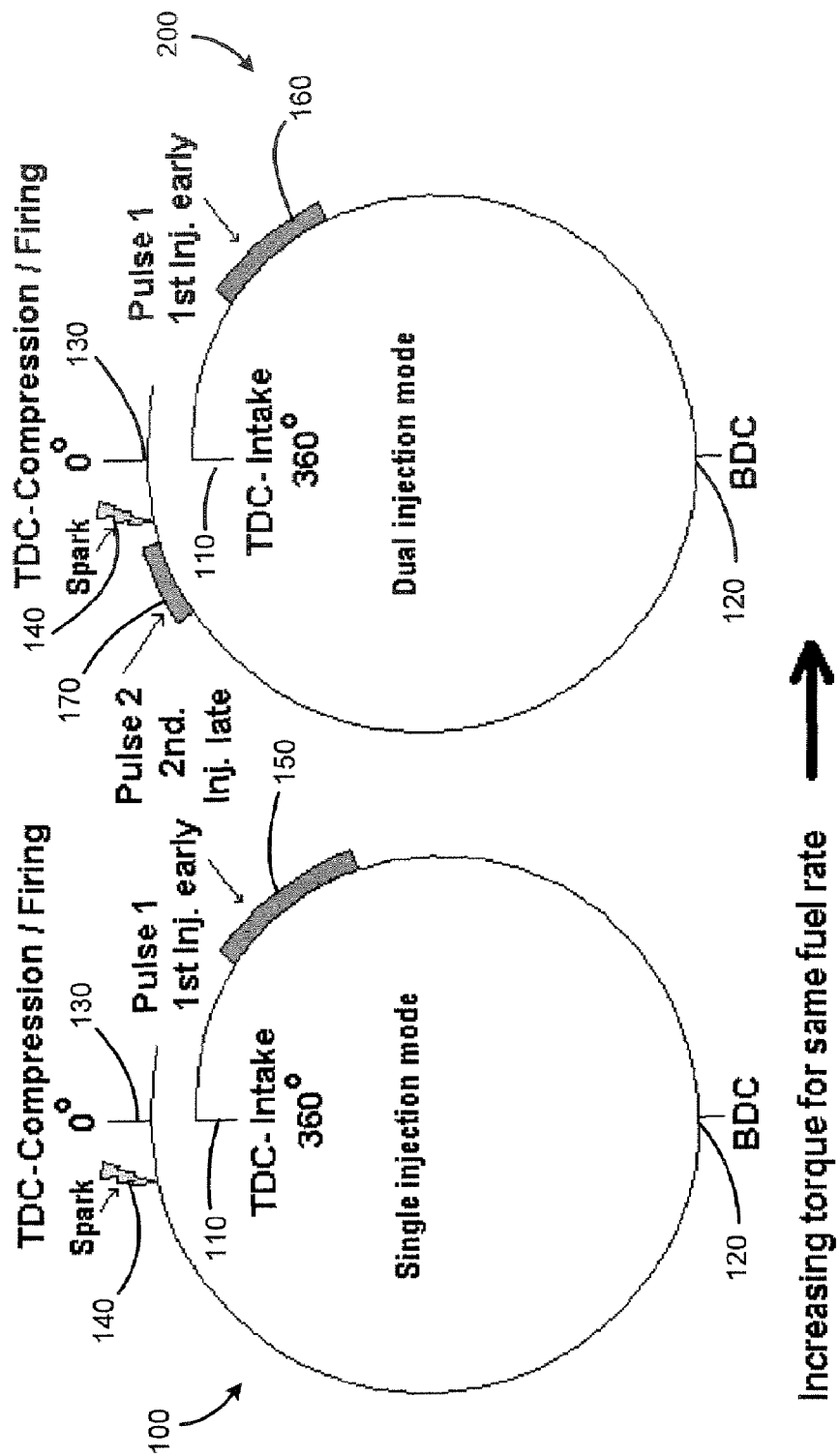
FIG. 4 is timing diagrams illustrating the scheduling of fuel injection events during a single injection mode and a dual injection mode.

During the dual injection mode, two injection events are scheduled per cylinder per combustion cycle. This generates a change in torque without increasing fuel consumption. Blending schedule 62 is implemented to smoothly transition engine operation between single and dual injection modes of operation. Torque variations or "bumps" during operating mode transitions are minimized. Blending schedule 62 will be described in greater detail hereinafter and is shown in FIG. 4.

FIG. 3 depicts a flow chart illustrating a method of transitioning between single injection and dual injection modes. For example, it may be beneficial to switch from a single injection mode to a dual injection mode to perform catalytic converter light off. Catalytic converter light off may be implemented soon after engine start up to quickly heat up the catalyst within the catalytic converter to reduce engine emissions. As shown in FIG. 3, control block 66 determines the temperature of the engine coolant. Decision block 68 determines if the coolant temperature is less than a predetermined constant $K_1$. $K_1$ may be chosen to represent a temperature indicative of an engine operating at start up or having run for a minimal amount of time. If the coolant temperature is greater than or equal to $K_1$, control returns to decision block 66. If the coolant temperature is less than $K_1$, control block 70 determines the engine operating speed.

Control block 72 determines if the engine speed is less than a predetermined constant $K_2$. If the engine is operating at a relatively low speed near idle, catalytic converter light off may be desirable. If the engine is operating at a higher speed, sufficient energy and additional fuel may already be supplied to the catalytic converter such that additional fuel need not be provided. Accordingly, if the engine speed is greater than or equal to $K_2$, control returns to control block 66. If the engine speed is less than $K_2$, control block 74 determines the vehicle speed. If the vehicle is in motion above a predetermined speed, catalytic converter light off may not be desirable because immediate engine response to a torque request may be desired. As such, decision block 76 determines if the vehicle speed is less than the predetermined constant $K_3$. If the vehicle speed is greater than or equal to $K_3$, control is returned to control block 66. If the vehicle speed is less than $K_3$, control block 78 transitions engine fuel injection from the single injection mode to the dual injection mode. The specific steps taken during the transition will be described in greater detail hereinafter. Once a transition from the single injection mode to the dual injection mode has been completed, decision block 80 determines the amount of time that the engine has been operating in the dual injection mode. Decision block 82 determines if the dual injection mode operating time is greater than a predetermined constant $K_4$. If the engine has not been operating within the dual injection mode greater than $K_4$, control returns to control block 80. If the dual injection mode operating time exceeds $K_4$, control block 84 calculates an amount of energy added to the catalytic converter by operation in the dual injection mode.

Decision block 86 determines if the energy added exceeds a predetermined threshold of $K_5$. If the energy threshold has not been reached, control returns to control block 84. If the energy threshold, $K_5$, has been exceeded, control block 88 transitions from the dual injection mode to the single injection mode.

Referring now to FIG. 4, timing diagrams for scheduling fuel injection events according to the present disclosure are shown. During engine operation, control begins in the single injection mode shown generally at 100. During the single injection mode, one injection event is scheduled per cylinder per combustion cycle. If injection mode module 50 determines that appropriate conditions exist, control switches to a dual injection mode shown generally at 200.

Injection mode module 50 may determine through evaluation of operating data 54 that a dual injection mode should be entered due to engine system 10 operating in a special regime. Examples relating to special operation regimes where mode switching would be beneficial include providing a smooth idle, reducing the engine knock and achieving quicker converter lightoff by enabling late spark advance where the spark is provided after top dead center. Accordingly, a need to transition between the single injection mode and the dual injection mode may occur at virtually any time during engine operation and at any number of engine operating speeds.

Fuel injection events can be scheduled according to the crankshaft position indicated by degrees of crank rotation. A crankshaft signal can be interpreted as a position in crank degrees. Each diagram illustrates the position of the crankshaft in crank degrees during intake and compression cycles. The piston begins an intake stroke at three hundred sixty (360) crank rotation degrees before top dead center at 110. The piston begins a compression stroke at one hundred eighty (180) crank rotation degrees before top dead center (also referred to bottom dead center (BDC)) at 120. The piston ends the compression stroke at top dead center or zero (0) crank rotation degrees shown at 130. Firing of spark for both the single injection mode 100 and the dual injection mode 200 occurs near top dead center of the compression stroke at 140. In an exemplary embodiment, firing occurs between ten (10) and zero (0) crank degrees before top dead center.

When in the single injection mode 100, a single injection event is scheduled early in the intake cycle. The injection event is scheduled early and can be scheduled anywhere between two hundred fifty (250) and three hundred eighty (380) crank degrees before firing of spark. An exemplary range for scheduling the fuel delivery is between two hundred and seventy (270) and three hundred and thirty (330) crank degrees before firing of spark as shown at 150. The single injection mode 100 delivers more or less torque than dual injection for the same conditions but allows for spark timing to be near minimum best torque (MBT) or knock border limit (KBL) to improve efficiency.

If an injection mode change is requested, control switches to the dual injection mode 200 and commands two fuel injection events per cylinder per intake and compression cycle. The first injection event is scheduled early in the intake cycle and can be scheduled anywhere between two hundred fifty (250) and three hundred eighty (380) crank degrees before firing of spark. An exemplary range for scheduling the first fuel delivery is between two hundred and seventy (270) and three hundred and thirty (330) crank degrees before firing of spark as shown at 160. The amount of fuel delivered during the first injection event varies based on blending schedule 62. In an exemplary embodiment, the amount of fuel delivered during the first injection event varies between fifty (50) and one hundred (100) percent of the total required fuel for the combustion stroke.

The second fuel injection event is scheduled in the compression cycle and can be scheduled anywhere between zero (0) and one hundred eighty (180) crank degrees before firing of spark. An exemplary range for scheduling the second fuel delivery is between twenty (20) and ninety (90) crank degrees before firing of spark as shown at 170. The second injection event injects the remainder of fuel necessary for the combustion cycle. An exemplary fuel delivery ranges from zero (0) and fifty (50) percent of the total fuel required for the combustion stroke.

Figure 5:
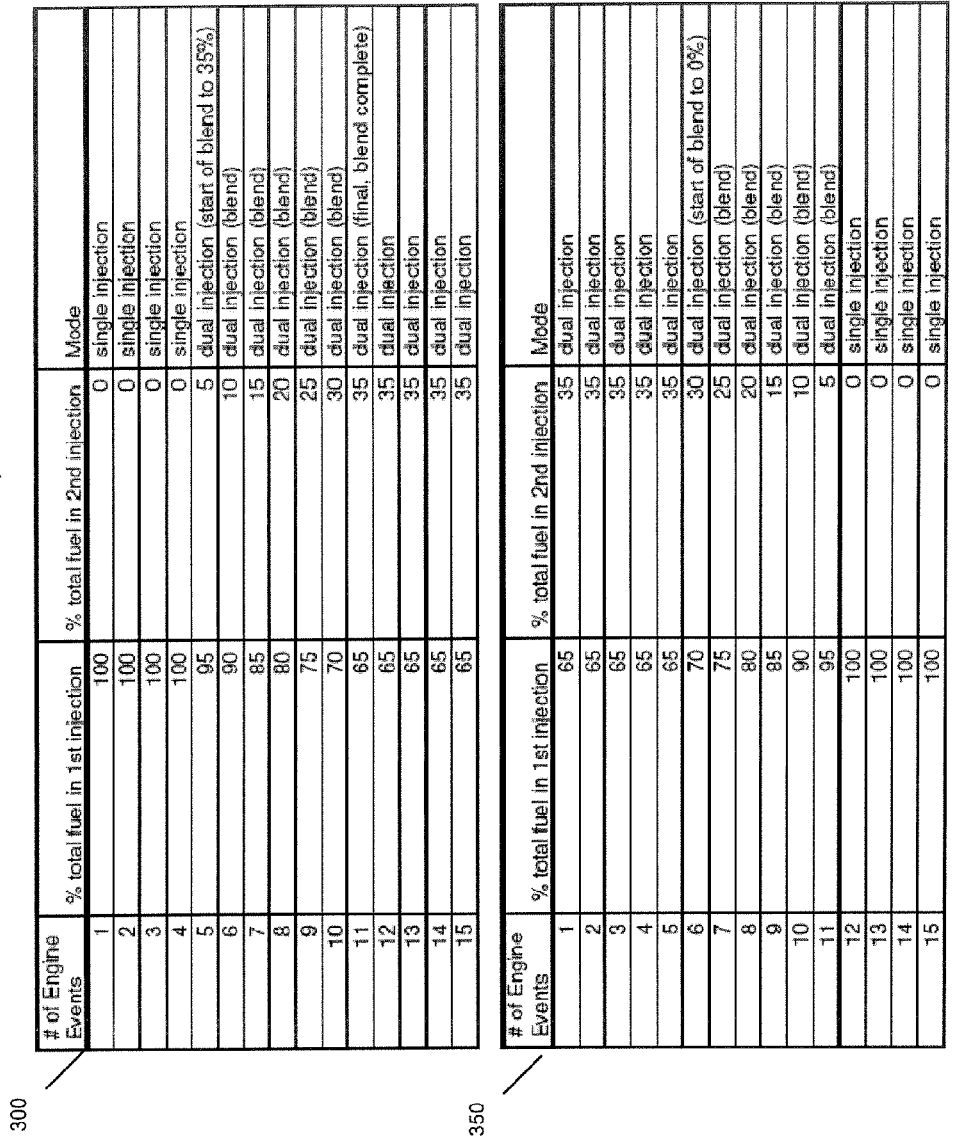
FIG. 5 is a fuel percentage blending schedule.

Referring now to FIG. 5, blending schedule 62 charts the percent total fuel provided during a first injection event and a second injection event per cylinder per intake and compression cycle. In particular, a blending schedule 300 is provided for switching from a single injection mode to a dual injection mode. Each engine event relates to a particular engine cylinder operating during the intake and compression stroke portions of operation. Once fuel injection command module 52 receives a signal indicating a switch from the single injection mode to the dual injection mode is desired, the single injection mode is continued for four engine events where one hundred (100) percent of the fuel is provided at the first injection event and no fuel or zero (0) percent is provided at the second injection event. At the fifth engine event, the percent of total fuel provided during the first injection event is reduced by five (5) percent to ninety-five (95) percent while the percent total fuel provided at the second injection event is increased by five (5) percent to begin the blending procedure. During engine events six through eleven, the percent total fuel provided during the first injection event is sequentially reduced by five (5) percent while the percent total fuel provided during the second injection even is increased sequentially by five (5) percent until the target split of sixty-five (65) percent total fuel is provided at the first injection event and thirty-five (35) percent total fuel is provided during the second injection event at engine event number eleven. Dual injection mode is continued at engine events twelve through fifteen where the sixty-five (65) to thirty-five (35) percent ratio is maintained. It should be appreciated that the sixty-five (65) to thirty-five (35) percent ratio is merely exemplary and that a desired split of fifty (50) percent to fifty (50) percent is also contemplated. Other ratios therebetween may be useful depending on the engine component configuration.

Similarly, blending schedule 350 (FIG. 5) is enabled when switching from the dual injection mode to the single injection mode. Once fuel injection command module 52 is in receipt of injection mode 56 to switch from the dual injection mode to the single injection mode, blending schedule 350 is invoked where engine events one through five maintain the target ratio of sixty-five (65) percent total fuel being delivered during the first injection event and thirty-five (35) percent total fuel being delivered during the second injection event. At engine event six, the percent total fuel delivered during the first injection event is increased by five (5) percent and the percent total fuel delivered during the second injection event is decreased by five (5) percent. A stepwise increase of the percent total fuel delivered during the first injection event continues to increase by five (5) percent increments until one hundred (100) percent is reached at engine event twelve. Correspondingly, the percent total fuel delivered during the second injection event is decreased by five (5) percent for every engine event until zero (0) percent fuel is delivered during the second injection event at step 12. At this time, the single injection mode has been entered. The single injection mode continues to operate until engine event fifteen. After engine event fifteen has been completed, fuel injection command module 52 may receive and respond to injection mode 56 to maintain operation in the single injection mode or to once again switch to a dual injection mode via blending schedule 300.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, the specification and the following claims.

What is claimed is:

1. A fuel injection system for a direct fuel injection engine, comprising:
   an injection mode module that selects a fuel injection mode to be one of a single injection mode and a dual injection mode during engine operation; and
   a fuel injection command module that commands fuel injection events based on a crankshaft position, the fuel injection mode and a fuel percentage blending schedule.

2. The system of claim 1 wherein the fuel injection command module commands fuel at a first rate when the crankshaft position is within a first predetermined range during the single injection mode.

3. The system of claim 2 wherein the first predetermined range is between two hundred and fifty and three hundred and eighty crank rotation degrees before spark is commanded near top dead center.

4. The system of claim 1 wherein the fuel injection command module transitions fuel command to a second rate and at a third rate based on the fuel percentage blending schedule.

5. The system of claim 4 wherein the fuel injection command module commands fuel at the second rate and the third rate when the crankshaft position signal indicates a crankshaft position within second and third predetermined ranges respectively during the dual injection mode.

6. The system of claim 5 wherein the second predetermined range is between two hundred and fifty and three hundred and eighty crank rotation degrees before spark is commanded near top dead center.

7. The system of claim 5 wherein the third predetermined range is between zero and one hundred and eighty crank rotation degrees before spark is commanded near top dead center.

8. The system of claim 4 wherein the fuel injection command module determines the second and the third rates based on a total fuel required for each intake and compression cycle.

9. The system of claim 4 wherein the second rate and the third rate are based on a first and a second predetermined percentage of the total fuel required for the intake and compression cycles, wherein the first predetermined percentage is between fifty and one hundred percent and the second predetermined percentage is between fifty and one hundred percent.

10. A fuel injection method for a direct fuel injection engine, comprising:
operating the engine in a single injection mode;
commanding fuel at a first rate during an intake cycle;
receiving a request to transition from a single injection mode to a dual injection mode; and
transitioning to the dual injection mode by commanding fuel at a second rate and at a third rate during the intake and compression cycles, wherein the second rate is decreased and the third rate is increased during subsequent cycles until target second and third rates are reached.

11. The method of claim 10 wherein the commanding fuel at a first rate and the commanding fuel at a second and at a third rate is based on a crankshaft position.

12. The method of claim 11 wherein the commanding fuel at a first rate further includes commanding fuel at a first rate when the crankshaft position is within a first predetermined range during the intake cycle of an engine cylinder.

13. The method of claim 11 wherein the commanding fuel at a second rate and at a third rate further includes commanding fuel at a second rate when the crankshaft position is within a second predetermined range and commanding fuel at a third rate when the crankshaft position is within a third predetermined range during the intake and compression cycles of the engine cylinder.

14. The method of claim 10 further including commanding spark when the crankshaft position is near top dead center during the single injection mode and the dual injection mode.

15. The method of claim 10 wherein the commanding fuel at a first rate further includes commanding fuel at a first rate when an engine crankshaft position is within a range of two hundred and fifty and three hundred and eighty degrees of crank rotation before top dead center.

16. The method of claim 10 wherein the commanding fuel at a second rate further includes commanding fuel at a second rate when an engine crankshaft position is within a range of two hundred and fifty and three hundred and eighty degrees of crank rotation before top dead center and wherein the commanding fuel at a third rate further comprises commanding fuel at a third rate when a crankshaft position is within a range of zero and one hundred and eighty degrees of crank rotation before top dead center.

17. The method of claim 10 wherein the commanding fuel at a second rate is based on a predetermined percentage of a total fuel desired for the intake and compression cycles.

18. The method of claim 17 wherein the commanding fuel at a second rate is based on the predetermined percentage of total fuel desired that begins at one hundred percent and is reduced to a value as low as fifty percent during the transition to the dual injection mode.

19. The method of claim 18 wherein the commanding fuel at a third rate is based on a predetermined percentage that begins at zero percent and is increased to a value as great as fifty percent during the transition to the dual injection mode.

20. The method of claim 10 wherein the commanding fuel at the third rate is based on a predetermined percentage of a total fuel desired for the intake and compression cycles.

21. The method of claim 20 wherein the commanding fuel at the third rate is based on the predetermined percentage that is between zero and fifty percent of total fuel desired for the intake and compression cycles.

* * * * *